United States Patent [19]

Boylen

[11] Patent Number: 5,571,249

[45] Date of Patent: Nov. 5, 1996

[54] FLUID SLEEVE FOR A MOTORIZED VEHICLE

[76] Inventor: Daniel B. Boylen, 219 Urban Dr., Verona, Pa. 15147

[21] Appl. No.: 441,025

[22] Filed: May 15, 1995

[51] Int. Cl.$^6$ .............................. B65B 1/04; B65B 3/04; B67C 3/02

[52] U.S. Cl. .................. 141/86; 141/88; 141/311 A; 141/390; 141/391; 222/108; 222/571; 184/106; 137/314

[58] Field of Search .................... 141/86, 87, 88, 141/286, 311 A, 390, 391, 392; 222/108, 109, 110, 111, 571; 184/106; 137/312, 313, 314

[56] References Cited

U.S. PATENT DOCUMENTS

| | | | |
|---|---|---|---|
| 2,538,813 | 1/1951 | Wagner | 141/390 |
| 2,555,868 | 3/1951 | Bowman | 226/129 |
| 2,659,523 | 11/1953 | Comber | 141/390 |
| 3,291,165 | 8/1963 | Fraylick | 141/390 |
| 3,451,445 | 6/1969 | Sippola | 222/108 |
| 4,013,105 | 3/1977 | Uuskallio | 141/86 |
| 4,113,153 | 9/1978 | Wellman | 222/571 |
| 4,817,691 | 4/1989 | Lau | 141/86 |
| 5,101,868 | 4/1992 | Bach | 141/88 |
| 5,322,099 | 6/1994 | Langlois | 141/86 |

*Primary Examiner*—Henry J. Recla
*Assistant Examiner*—Timothy L. Maust
*Attorney, Agent, or Firm*—Reed Smith Shaw & McClay

[57] ABSTRACT

A fluid sleeve for channeling fluid spilled during the servicing of a motorized vehicle includes a top portion, a bottom portion, and an enclosed body portion extending between the top portion and the bottom portion. The body portion defines a first opening operable to engage a fluid inlet of the motorized vehicle and a second opening operable to engage a fluid outlet of a fluid container received therethrough to be disposed in the fluid inlet. In use, when fluid is discharged or otherwise spilled from the fluid inlet or the fluid outlet during servicing, the fluid is retained within the body portion and channeled toward the bottom portion.

13 Claims, 4 Drawing Sheets

FLUID SLEEVE FOR A MOTORIZED VEHICLE

BACKGROUND OF THE INVENTION

The present invention relates generally to a fluid sleeve for use with motorized vehicles and, more particularly, to a fluid sleeve that channels spilled fluids away from the vehicle.

It is a common occurrence for fuel or other fluids to either spill onto the ground or to drip or splatter onto the paint work or surface finish of an automobile or other motorized vehicle during the servicing thereof. For example, during automotive refueling, fuel often surges out of the fuel inlet of the automobile or drips from the fuel nozzle when it is removed from the fuel inlet.

As a consequence of fuel or other fluids and solutions (e.g., antifreeze, oil, etc.) periodically spilling onto the vehicle, the finish of the vehicle is eventually damaged, giving the affected area a dull and unpleasing appearance.

A variety of devices have been proposed for preventing spilled fuel from contacting an automobile's finished surfaces, none of which have been particularly satisfying. For example, U.S. Pat. No. 2,659,523 to Comber discloses a flat, rectangular bib having an aperture for mounting the bib around an automobile's fuel inlet. The aperture includes a seal to prevent fuel from escaping from any gaps therearound in the event of a spill. The bib is made of flexible rubber with a raised bead around its edge. However, if anything other than a minor spill occurs, fuel would flow over the raised bead and onto the unprotected portions of the automobile's body.

U.S. Pat. No. 2,555,868 to Bowman discloses a drip tray that collects the drippings from a fuel nozzle when it is withdrawn from an automobile's fuel inlet after refueling. The drip tray, however, includes an open front to receive the fuel nozzle. Thus, if a massive discharge of fuel from the fuel inlet occurs (as frequently happens when the fuel nozzle is injecting fuel at a high flow rate as the fuel tank abruptly becomes full), the fuel may escape from the drip tray and spill onto the automobile.

Also, U.S. Pat. No. 4,817,691 to Lau discloses a fuel bib that is trough-shaped to direct spilled fuel away from the automobile and onto the ground. Because the fuel bib is not enclosed (similar to the drip tray disclosed in the '868 patent), a massive discharge of fuel from the fuel inlet may result in fuel being spilled onto the automobile.

Therefore, an improved device for protecting the finished surfaces of motorized vehicles from spilled fuel and other fluids would prove to be beneficial for vehicle operators and business establishments in the vehicle-servicing field.

Apart from the fluid-spillage problem discussed above, due to heightened environmental concerns the use and/or disposal of various automotive fluids, including motor oil, transmission fluid, air-conditioning refrigerant and gasoline, have been regulated or even eliminated. For example, many, if not all, states have regulated the disposal of motor oil and transmission fluid to prevent people and business establishments from dumping the same into the environment and thereby creating hazardous water-quality conditions. Also, due to ozone layer-depletion concerns, the government has recently initiated a time-table for eliminating the use of some air-conditioning refrigerants. Furthermore, some states, including California, have mandated that fuel pump nozzles be modified to prevent gasoline vapor from entering into the atmosphere during automotive refueling.

Because it is likely that additional regulations affecting the use and/or disposal of automotive fluids will be enacted in the future, it is possible that steps will be required to be taken to reduce or prevent the spillage of fuel and other automotive fluids that normally occasions the servicing of motorized vehicles.

Thus, a device for collecting spilled fluids for subsequent use or disposal would also be beneficial for vehicle operators and business establishments, and may in fact be required in later years.

SUMMARY OF THE INVENTION

The present invention provides a fluid sleeve that controls and channels fluids spilled during the servicing of a motorized vehicle. By diverting the spilled fluids away from the vehicle, the fluid sleeve protects the vehicle's finished surfaces from the damage that would otherwise occur thereto due to the spilled fuel or other automotive fluids. In addition, if environmental regulations or other concerns discourage or prohibit diverting spilled fluids onto the ground or otherwise, the fluid sleeve can be used to store or contain the fluids for future use or disposal or to divert the spilled fluids to a fluid collection device.

According to a first aspect of the present invention, a fluid sleeve for channeling fluids spilled during the servicing of a motorized vehicle includes a top portion, a bottom portion, and an enclosed body portion extending between the top portion and the bottom portion. The body portion defines a first opening operable to engage a fluid inlet of the motorized vehicle and a second opening operable to engage a fluid outlet of a fluid container received therethrough to be disposed in the fluid inlet. In use, when fluid is discharged from the fluid inlet or the fluid outlet during servicing, the fluid is retained within the body portion and channeled toward the bottom portion.

According to a second aspect of the present invention, a fuel pump includes a fuel nozzle connected thereto for fueling a motorized vehicle and a fluid sleeve attached to the fuel nozzle. The fluid sleeve includes a top portion, a bottom portion, and an enclosed body portion extending between the top portion and the bottom portion. The body portion defines a first opening operable to engage a fuel inlet of the motorized vehicle and a second opening operable to engage the fuel nozzle to be disposed in the fuel inlet. In use, when fuel is discharged from the fuel inlet or the fuel nozzle during fueling, the fuel is retained within the body portion and channeled toward the bottom portion.

According to a third aspect of the present invention, a fluid sleeve for channeling fuel spilled during the fueling of a motorized vehicle includes a top portion, a bottom portion defining a drain, and an enclosed, substantially cylindrical body portion extending between the top portion and the bottom portion. The body portion is formed of an elastic material that defines a first opening operable to closely engage a fuel inlet of the motorized vehicle and a second opening operable to closely engage a fuel nozzle of fuel pump received therethrough to be disposed in the fuel inlet. In use, when fuel is discharged from the fuel inlet or the fuel nozzle during fueling, the fuel is retained within the body portion and channeled toward the bottom portion away from the motorized vehicle.

The fluid sleeve of the present invention may be used to protect a motorized vehicle's finished surfaces from the deleterious effects of a spill of gasoline, motor oil, diesel fuel or other harmful fluids thereon. The fluid sleeve diverts the spilled fluids away from the vehicle's body. Depending on the user's preference or the environmental regulations then in force, the fluids may be stored in the fluid sleeve for later use or disposal, immediately channeled to a fluid collection device, or diverted onto the ground or otherwise.

The present invention, together with further aspects and attendant advantages, will best be understood by reference to the following detailed description taken in conjunction with the accompanying drawings.

DETAILED DESCRIPTION OF THE PRESENTLY PREFERRED EMBODIMENTS

As a representative example, the fluid sleeve of the present invention is primarily shown and described below in terms of its use during the refueling of a motorized vehicle. However, it is specifically contemplated that the fluid sleeve of the present invention may be used to channel various spilled fluids, including, but not limited to, antifreeze, motor oil, transmission fluid, power-steering fluid, brake fluid and windshield-washer fluid, away from a vehicle during servicing.

Figure 1:
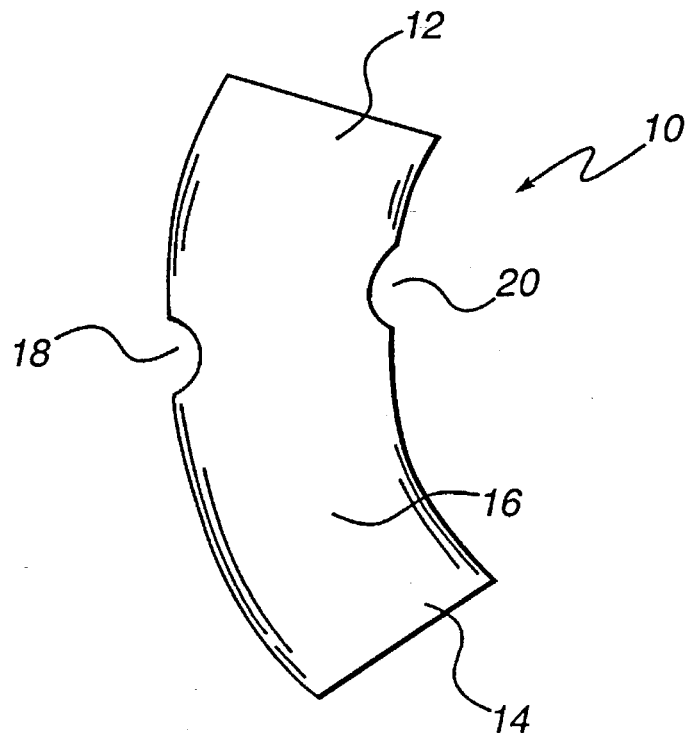
FIG. 1 is an elevational view of a first preferred embodiment of the fluid sleeve of the present invention.
Figure 2:
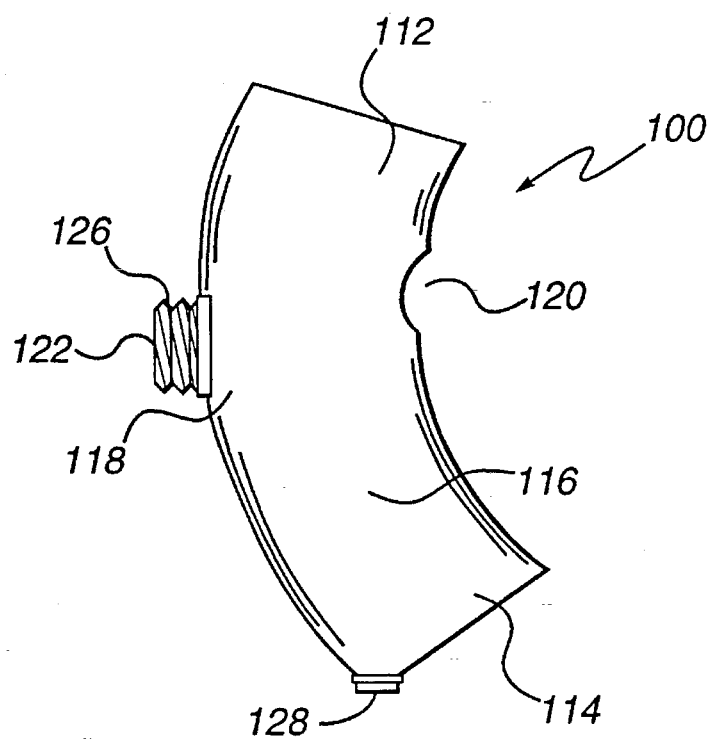
FIG. 2 is an elevational view of a second preferred embodiment of the fluid sleeve of the present invention.

Turning now to the drawings, FIGS. 1 and 2 each show a preferred embodiment of the fluid sleeve 10, 100 of the present invention. As shown, each of the fluid sleeves 10, 100 is preferably curved about its longitudinal axis and includes a top portion 12, 112, a bottom portion 14, 114 and a body portion 16, 116 extending therebetween. Each of the body portions 16, 116 defines two openings 18, 118, 20, 120 therein. The first openings 18, 118 are operable to engage a fluid inlet (not shown) of a motorized vehicle and the second openings 20, 120 are operable to engage the fluid outlet of a fluid container (not shown). As discussed below, any fluids that are spilled from the fluid inlet and/or the fluid outlet during vehicle servicing are retained within the body portions 16, 116 of the fluid sleeves 10, 100 and channeled to the bottom portions 14, 114.

As shown in FIG. 2, the second preferred embodiment of the fluid sleeve 100 includes a connector 122 associated with the first opening 118. The connector 122 is preferably secured along the periphery of the first opening 118 to the body portion 116. The connector 122 may be secured to the body portion 116 by any conventional means, including structural adhesives.

The connector 122 preferably defines an internal bore 124 (shown in FIG. 5) in coaxial alignment with the first opening 118, and an external thread 126. As explained below, the connector 122 provides an alternate means for interfacing the first opening 118 of the fluid sleeve 100 with the fuel inlet.

Further, the fluid sleeve 100 preferably includes a drain having a drain plug 128. By removing the drain plug from the drain 128, the spilled fluids collected in the bottom portion 114 may be drained therefrom and diverted to, for example, a fluid collection device (not shown).

In addition, depending on the application, the top portions 12, 112 of the fluid sleeves 10, 100 shown in FIGS. 1 and 2 may be left open to the environment. If, for example, the accumulation of fluid vapor in the top portions 12, 112 of the fluid sleeves 10, 100 may be hazardous to the user or otherwise undesired, and the release of the fluid vapor to the environment is not regulated, an open top portion 12, 112 may be desirable.

Preferably, the fluid sleeves 10, 100 are formed from a flexible and elastic material, such as rubber, and are impervious to gasoline, diesel fuel, oil and other types of fluids normally used in motorized vehicles, some of which are listed directly above.

Moreover, the fluid sleeves 10, 100 preferably comprise a substantially circular cross-section. However, in alternate embodiments the fluid sleeves 10, 100 may comprise different cross-sections, including substantially rectangular cross-sections.

Figure 3:
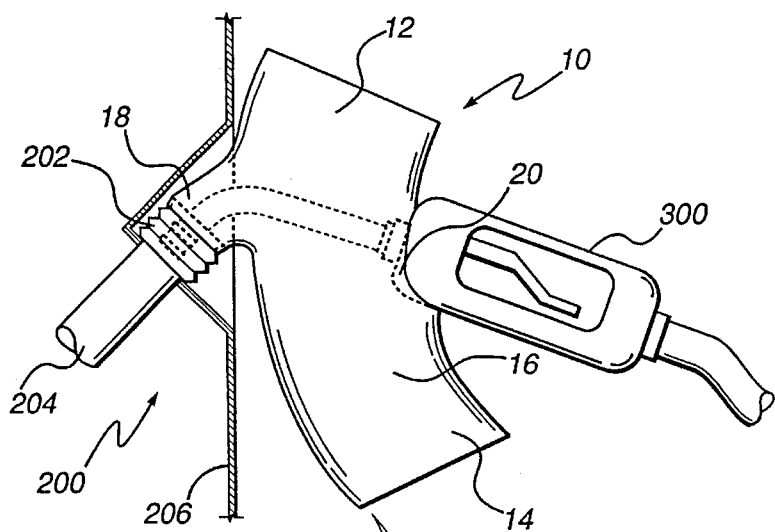
FIG. 3 is an operational view of the first preferred embodiment of the fluid sleeve engaging a fuel inlet and a fuel nozzle.

FIG. 3 depicts the first embodiment of the fluid sleeve 10 in use during the refueling of a motorized vehicle 200. As shown, the first opening 18 of the fluid sleeve 10 engages the neck 202 of a fuel inlet 204 and the second opening 20 engages a fuel nozzle 300 that is received therethrough to be inserted into the fuel inlet 204.

Because the fluid sleeve 10 is preferably made from a flexible and elastic material, the body portion 16 is sufficiently flexible to accommodate fuel inlets in various locations and orientations. Furthermore, the elasticity of the material permits the first and second openings 18, 20 of the fluid sleeve 10 to be stretched to tightly grip the fuel inlet 204 and the fuel nozzle 300, respectively.

When, as shown in FIG. 3, fuel is pumped into a motorized vehicle 200, fuel is often discharged from the fuel inlet 204 (i.e., when the fuel tank abruptly becomes full) or drips from the fuel nozzle 300. Any fuel spilling from the fuel inlet 204 or the fuel nozzle 300 is retained within the body portion 16 by the close engagement of the first and second openings 18, 20 with the fuel inlet 204 and the fuel nozzle 300, respectively.

After the spilled fluid is retained by the body portion 16, it is diverted or channelled by the body portion 16 to the bottom portion 14 of the fluid sleeve 10. As shown in FIG. 3, the bottom portion 14 of the first preferred embodiment of the fluid sleeve 10 is preferably left open to the environment and the spilled fluid is therefore diverted onto the ground or otherwise. Because the fluid sleeve 10 is curved, the spilled fluid is diverted away from the polished surface 206 of the vehicle 200 and thus will not damage same.

Figure 4:
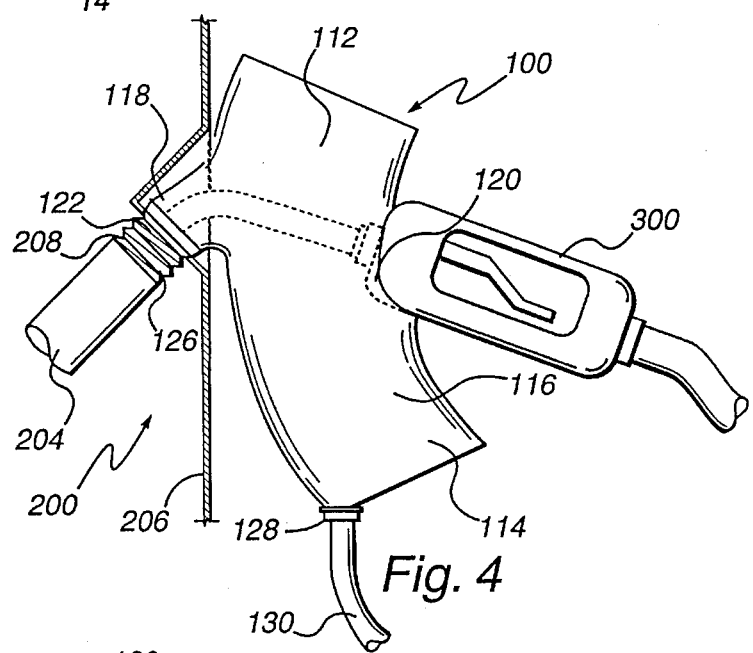
FIG. 4 is an operational view of the second preferred embodiment of the fluid sleeve engaging a fuel inlet and a fuel nozzle.
Figure 5:
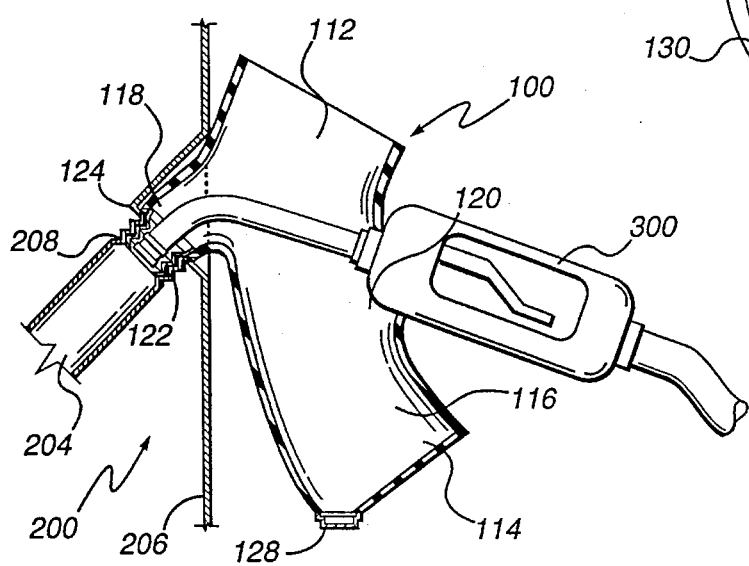
FIG. 5 is a cross-sectional view of the fluid sleeve and the fuel inlet shown in FIG. 4.

FIGS. 4 and 5 depict the second embodiment of the fluid sleeve 100 in use during the refueling of the motorized vehicle 200. As shown, the connector 122 aligned with the first opening 118 of the fluid sleeve 100 is interfaced with the fuel inlet 204. Specifically, the external thread 126 of the connector 122 is turned onto the internal thread 208 of a conventional fuel inlet 204 As described above, the second opening 120 closely engages the fuel nozzle 300 that is received therethrough to be inserted into the fuel inlet 204.

As with the embodiment shown in FIG. 3, any fuel that is spilled during the refueling process is retained within the body portion 116 of the fluid sleeve 100 and channelled to the bottom portion 114. Unlike the first embodiment shown in FIGS. 1 and 3, the bottom portion 114 of the fluid sleeve 100 is preferably closed to the environment to retain the fuel therein, and contains a drain 128 to remove the spilled fuel therefrom for subsequent use, disposal or storage.

The drain 128 of the fluid sleeve 100, as shown in FIG. 3, may have a conduit or hose 130 connected thereto in any conventional manner to channel the spilled fuel directly to a fuel collection device or otherwise. In addition, the top portion 112 of the fluid sleeve 100 is preferably closed to, for example, prevent the escape of harmful fluid vapors (e.g., air-conditioning refrigerant or gasoline vapors) to the environment.

As can be ascertained, the embodiment of the fluid sleeve 100 shown in FIGS. 1, 4 and 5 may be desirable when environmental concerns or regulations either discourage or forbid spilled fuel or other fluids from being diverted to the environment.

Figure 6:
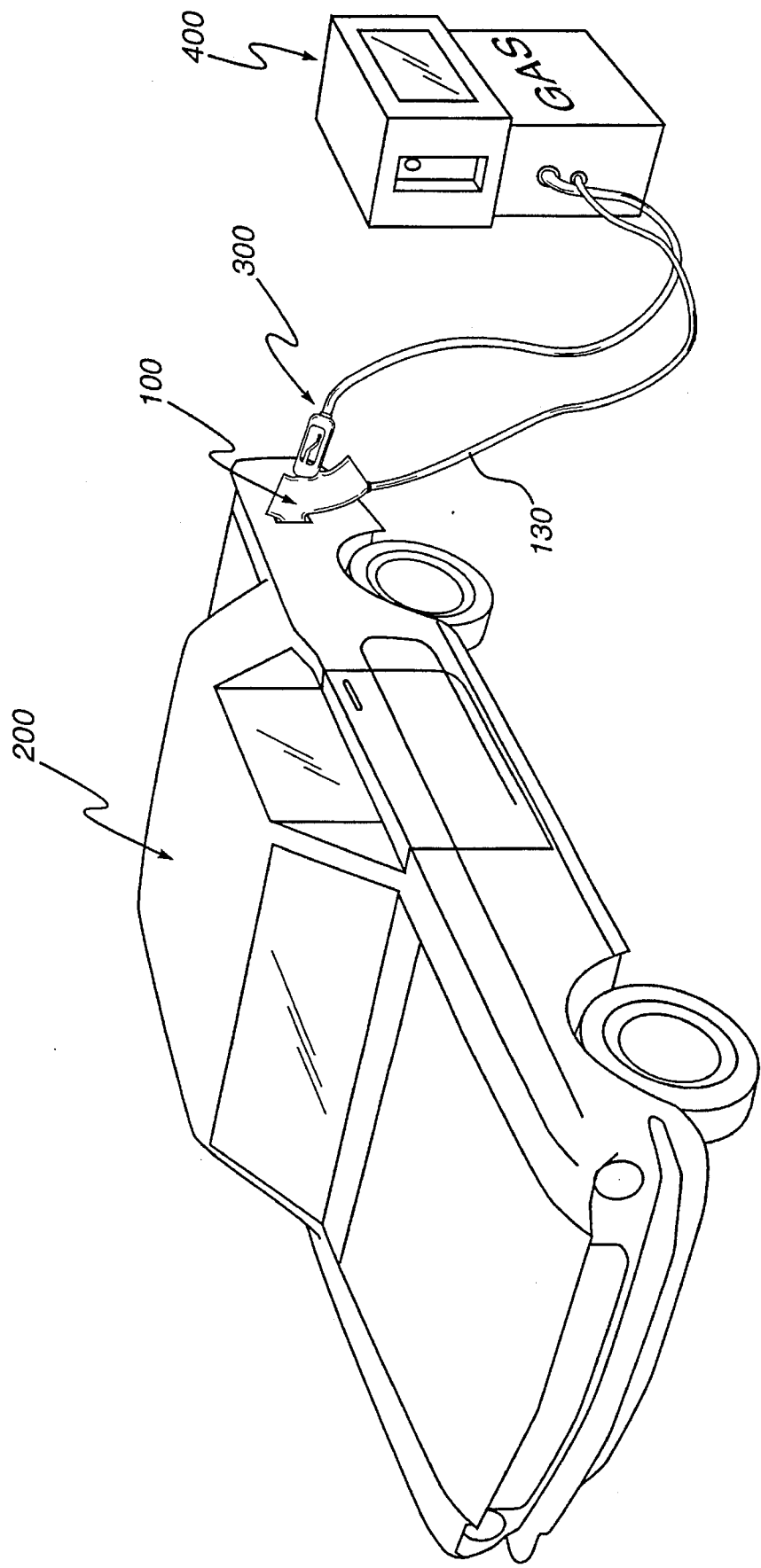
FIG. 6 is a perspective view of the fluid sleeve of the present invention in use during the refueling of an automobile.

The fluid sleeve 10, 100 of the present invention may be used by owners or operators of motorized vehicles, or by owners of business establishments that service motorized vehicles. For example, as shown in FIG. 6, fuel pump manufacturers or gas station owners may provide fuel pumps 400 incorporating the fluid sleeve 10, 100 to protect the finished surfaces of customers vehicles from the damage caused by spilled automotive fluids. Further, for safety, environmental or other reasons, fuel pumps 400 and other fluid containers may be required to have equipment for channeling spilled fuel or other fluids back to the fluid containers or to other suitable fluid collection devices for subsequent use or disposal.

If, as shown in FIG. 6, a fuel pump 400 incorporates a fluid sleeve 10, 100 as described herein, the fluid sleeve 10, 100 may be integrally formed with the fuel nozzle 300, adhesively secured thereto, or secured in any other suitable fashion. While FIG. 6 depicts the fluid sleeve 10, 100 being used with a fuel pump 400, it is specifically contemplated that the fluid sleeve 10, 100 can be adapted for use with various other types of fluid containers, including oil cans, windshield-washer containers, and spouted containers.

Figure 7:
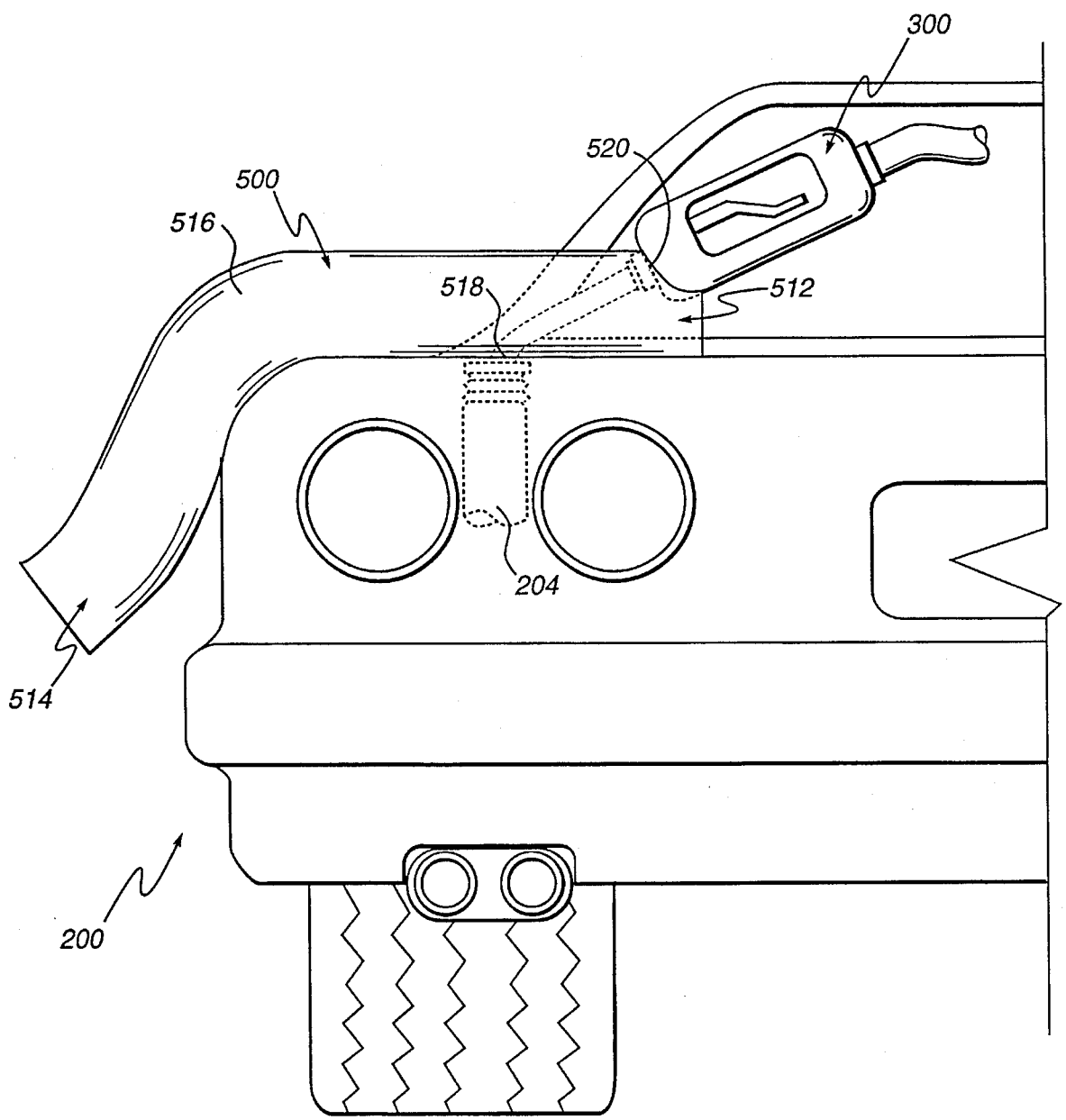
FIG. 7 is an elevational view of an alternate embodiment of the fluid sleeve of the present invention in use during the refueling of an automobile.

As shown in FIG. 7, an alternate embodiment of the fluid sleeve 500 is shown in use with an automobile 200 having a fuel inlet 204 on an upper portion thereof. The fluid sleeve 500 shown in FIG. 7 has an elongated body portion 516 to insure that the fuel is diverted away from the finished surfaces of the automobile 200. As with the embodiments described above, according to the requirements of a specific application the fuel sleeve 500 may be configured with an open or a closed top portion 512, an open or a closed bottom portion 514, a drain (not shown), a connector (not shown) or a conduit (not shown).

As described above, the fluid sleeve of the present invention may be used to protect a motorized vehicle's finished surfaces from the deleterious effects caused by a spill of gasoline, motor oil, diesel fuel or other harmful fluids thereon. Depending on the user's preference or the environmental regulations then in force, the fluids may be stored in the fluid sleeve for later use or disposal, immediately channeled to a fluid collection device, or diverted onto the ground or otherwise.

It should be appreciated that the present invention may be configured as appropriate for the application. The different elements of the fluid sleeve embodiments described above can be mixed and matched to provide the structure desired for a specific fluid sleeve. For example, a fluid sleeve having a drain, an open top portion and a connector could be devised.

Additionally, the length of the fluid sleeve may be varied to suit the particular application. Generally, the fluid sleeve should be made sufficiently long to insure that the spilled fluids captured therein will not be subsequently diverted onto the vehicle's finished surfaces.

Further, depending on the positioning of the fuel inlet with respect to the contours of a vehicle's finished surfaces, the orientation of the fluid sleeve 10, 100, 500 may need to be changed (i.e., the fluid inlet inserted through the first opening 18, 118, 518 instead of the second opening 20, 120, 580) for it to properly operate to divert the spilled fluids away from the vehicle.

Moreover, the fluid sleeve 10, 100, 500 may be fashioned with only one opening for accommodating the fluid inlet of a motorized vehicle. In this embodiment, depending on the configuration of the fluid outlet (e.g., motor oil spout), the fluid outlet may be inserted, for example, through the top or bottom portions of the fluid sleeve 10, 100, 500.

The embodiments described above are to be considered in all respects only as illustrative and not restrictive. The scope of the invention is indicated by the following claims rather than by the foregoing description. All changes which come within the meaning and range of equivalency of the claims are to be embraced within their scope.

I claim:

1. A fluid sleeve for channeling fluids spilled during the servicing of a motorized vehicle, the fluid sleeve comprising:

an enclosed body having a top portion having a drain therein and a bottom portion, the enclosed body defining a substantially cylindrical member having a longitudinal axis, the enclosed body defining a flexible first opening operable to sealingly engage a fluid inlet of the motorized vehicle and a flexible second opening operable to sealingly engage a fluid outlet of a fluid container received therethrough to be disposed in the fluid inlet, at least a portion of the cyclindrical member being curved away from the first opening to divert fluids away from the motorized vehicle, whereby fluid discharged from the fluid inlet or the fluid outlet during servicing is retained within the body portion and channeled toward the drain in the bottom portion; and a connector connected to the body portion at the first opening, the connector operable to interface the first opening with the fluid inlet.

2. The fluid sleeve of claim 1 wherein the connector comprises a substantially cylindrical member having an external thread and defining an internal bore, the internal bore coaxially aligned with the first opening.

3. The fluid sleeve of claim 1, further comprising a conduit connectable to the drain for channeling the fluid to a collection device.

4. The fluid sleeve of claim 1 wherein the body portion comprises an elastic material.

5. The fluid sleeve of claim 4 wherein the first opening and the second opening defined in the body portion are stretched to closely engage the fluid inlet and the fluid outlet, respectively.

6. The fluid sleeve of claim 1 wherein the fluid inlet comprises a fuel inlet and the fluid outlet comprises a fuel nozzle of a fuel pump.

7. The fluid sleeve of claim 1 wherein the top portion is closed to the environment.

8. A fuel pump having a fuel nozzle connected thereto for fueling a motorized vehicle and a fluid sleeve attached to the fuel nozzle, the fluid sleeve comprising:

an enclosed body having a top portion and a bottom portion having a drain therein, the enclosed body defining a substantially cylindrical member having a longitudinal axis, the enclosed body defining a flexible first opening operable to sealingly engage a fuel inlet of the motorized vehicle and a flexible second opening operable to sealingly engage the fuel nozzle to be disposed in the fuel inlet, at least a portion of the cylindrical member being curved away from the first opening to divert fluids away from the motorized vehicle, whereby fuel discharged from the fuel inlet or the fuel nozzle during fueling is retained within the body portion and channeled toward the drain in the bottom portion; and a connector connected to the body portion at the first opening, the connector operable to interface the first opening with the fuel inlet.

9. The fuel pump of claim 8, further comprising a conduit in fluid communication with the bottom portion and a fuel collection device, whereby fuel is channeled by the bottom portion and the conduit to the fuel collection device.

10. A fluid sleeve for channeling fuel spilled during the fueling of a motorized vehicle, the fluid sleeve comprising:

an enclosed, substantially cylindrical body having a top portion and a bottom portion having a drain therein, the enclosed body comprising an elastic material that defines a first opening operable to sealingly engage a fuel inlet of the motorized vehicle and a second opening operable to sealingly engage a fuel nozzle of a fuel pump received therethrough to be disposed in the fluid inlet, whereby fuel discharged from the fuel inlet or the fuel nozzle during fueling is retained within the body portion and channeled toward the bottom portion away from the motorized vehicle; and a connector connected to the body portion at the first opening, the connector operable to interface the first opening with the fuel inlet.

11. The fluid sleeve of claim 10, further comprising a conduit connected to the drain, the conduit operable to channel the fuel to a fuel collection device.

12. The fluid sleeve of claim 10 wherein the connector comprises a substantially cylindrical member having an external thread and defining an internal bore, the internal bore coaxially aligned with the first opening.

13. The fluid sleeve of claim 10 wherein the top portion defines an opening to the environment.

* * * * *